United States Patent [19]

Kunnen et al.

[11] 4,215,162

[45] Jul. 29, 1980

[54] PROCESS OF COATING METAL SURFACES

[75] Inventors: Jan Kunnen, Noordwijkerhout; Abraham C. van der Schee, Oegstgeest, both of Netherlands

[73] Assignee: Akzo N.V., Arnhem, Netherlands

[21] Appl. No.: 846,360

[22] Filed: Oct. 28, 1977

Related U.S. Application Data

[63] Continuation of Ser. No. 689,958, May 25, 1976, abandoned.

[30] Foreign Application Priority Data

May 30, 1975 [NL] Netherlands ................ 7506412

[51] Int. Cl.² .............................................. B05D 1/18
[52] U.S. Cl. ..................................... 427/435; 427/309; 260/29.6 TA; 260/29.6 N; 260/29.6 H
[58] Field of Search ................... 427/435, 309, 437; 260/29.6 T, 29.6 A, 29.6 N, 29.6 H

[56] References Cited

U.S. PATENT DOCUMENTS

| | | | |
|---|---|---|---|
| 3,585,084 | 6/1971 | Steinbrecher | 427/435 |
| 3,647,567 | 3/1972 | Schweri | 427/435 |
| 3,709,743 | 1/1973 | Dalton | 427/435 |
| 3,839,097 | 10/1974 | Hall et al. | 427/435 |
| 4,108,817 | 8/1978 | Lochel, Jr. | 148/6.2 |
| 4,160,756 | 7/1979 | Nishida et al. | 427/435 |

FOREIGN PATENT DOCUMENTS 7208132  6/1972  Netherlands .

OTHER PUBLICATIONS

Mazia, "Tech. Developments in 1978", Metal Finishing Mag., Feb., 1979.
Kirk–Othmer Encyclopedia of Chemical Technology, 2nd Ed., Wiley & Sons, Inc. N.Y., pp. 554–555.

*Primary Examiner*—Michael F. Esposito
*Assistant Examiner*—Richard Bueker
*Attorney, Agent, or Firm*—Stevens, Davis, Miller & Mosher

[57] ABSTRACT

A process is provided for applying a coating of film-forming material to an acid-etchable metal without the use of electricity wherein the metal is immersed in an aqueous dispersion of a film-forming material cationically dispersed in water which also contains the carboxylic acid radical derived from acrylic acid or methacrylic acid or an oligomer thereof, and the resulting wet coating is dried on the surface of the metal.

6 Claims, No Drawings

PROCESS OF COATING METAL SURFACES

This is a continuation of application Ser. No 689,958 filed May 25, 1976, now abandoned.

This invention relates to a process of applying a coating of film-forming material to an acid-etchable metal, the metal surface being contacted with an aqueous dispersion of the film-forming material, which contains a metal-etching acid, followed by drying the coating.

A process of the type indicated above is known from for instance British Patent No. 1 099 461. In this process use is made of an acidic dispersion of a film-forming polymer, which attacks the metal and generates metal ions which render the polymer dispersion unstable and cause coagulation of the film-forming polymer on the metal surface. The destabilization envisaged, of course, presupposes the use of an essentially anionic polymer dispersion because the negatively charged polymer particles can be coagulated then by positive metal ions formed in situ.

In British Patent No. 1 241 991 it is also proposed that a depolarizing oxidant be added to an anionic polymer dispersion in order to obtain a coating with improved properties.

According to Belgian Patent Specification No. 792 737, the coagulating metal ion gradually accummulating in the bath can be removed from an anionic and/or non-ionic polymer dispersion with the aid of a cation exchanger. It is true that upon coagulation of the polymer dispersion, an uneven surface is obtained. But this may be counteracted by adding a small amount of a cationic or amphoteric emulsifying agent to the anionic and/or non-ionic polymer dispersion. In this patent specification it is also stated that the coating thickness of the film-forming polymer decreases with increasing amount of such a positively charged emulsifying agent and not more than 0.5 g/l of the cationic or amphoteric emulsifying agent is added to the polymer dispersion. A further disadvantage of the known processes is that the coating has a low moisture resistance. Moreover, the acid and surface active compounds attack the metal substrate fairly strongly, as a result of which the polymer dispersion bath will be contaminated rather rapidly.

The present invention has for its object to provide a coating composition by which the above-mentioned disadvantages are effectively obviated. It is to be noted that in the process according to the invention the coating of film-forming material is applied to the metal surface without the use of the electrical equipment required in the electrodeposition process.

The foregoing objects of the invention are accomplished in accordance with this invention by providing a process for coating metal wherein metal to be coated is immersed in an aqueous dispersion containing a film-forming material cationically dispersed in water which contains the carboxylic acid radical derived from acrylic acid and/or methacrylic acid or an oligomer thereof.

That it is the cationic dispersions which yield excellent results is very surprising in that it is known of cationic emulsifying agents that they strongly reduce the acid-etchability of metals. One would therefore expect that the metal is insufficiently attacked and too few ions are generated, which would result in the polymer dispersion being rendered insufficiently unstable and no coating being formed. Besides, the man skilled in the art will realize that the positive metal ions formed in situ will not destabilize the positive polymer particles.

By the process provided by the invention all kinds of metals or metal alloys can be provided with a coating of the film-forming material. Suitable substrates are steel, iron and zinc, which may or may not be galvanized or phosphated or may be provided or not with a chromate, an oxalate or an oxide layer. Other suitable metals are, for instance, copper, lead, cadmium and magnesium and alloys such as brass. It is preferred that as metal substrate steel should be used.

Although in the process of the invention the film-forming material to be applied to a metal substrate may be chosen from widely different dispersions such as those of waxes, oils and fats, it is preferred that use should be made of a resin dispersion and/or a polymer dispersion. As examples of suitable cationic polymer dispersions may be mentioned dispersions obtained by emulsion polymerization of monomers such as the vinyl esters of fatty acids with 1–18 carbon atoms, such as vinyl acetate, vinyl propionate vinyl butyrate, vinyl laurate and vinyl stearate: ethylenically unsaturated acids such as acrylic acid, methacrylic acid, crotonic acid, itaconic acid and fumaric acid or mesaconic acid, citraconic acid, maleic anhydride or esters of such acids with alcohols, glycols or epoxides with 1–18 carbon atoms, such as methyl acrylate, methyl methacrylate, ethyl acrylate, glycidyl methacrylate, isopropyl acrylate, the various butyl acrylates or butyl methacrylates, cyclohexyl methacrylate, isobornyl acrylate and 2-ethylhexyl acrylate or mixtures of the above-mentioned compounds. Other suitable monomers are for instance: acrylonitrile, methacrylonitrile, acrylamdie, methacrylamide, styrene, 1,3-butadiene, vinyl toluene, divinyl benzene, tert.butyl aminoethyl methacrylate, hydroxyalkyl acrylates or methacrylates and compounds such as 2-hydroxypropyl methacrylate-trimethyl-ammonium chloride and ethyl methacrylate-trimethyl-ammonium methyl sulphate. As polymer dispersion also may be used the dispersion formed by dispersing in water a previously prepared film-forming polymer, use being made of a cationic emulsifying agent. In general the polymer dispersion has a solids content in the range of 10 to 70%, and preferably in the range of 20 to 50% by weight.

To obtain a cationic dispersion any cationic or amphoteric surface active compound may be used. As examples of suitable cationic compounds may be mentioned primary alkyl monoamine, such as tall fatty acid amine, tertiary alkyl monoamines, such as dimethyl stearyl amine; N-alkyl diamines such as tall fatty acid propylene diamine; N-alkyl triamines such as tall fatty acid dipropylene triamine; N-alkyl polyamines such as tall fatty acid polypropylene polyamine; ethoxylated primary alkyl monoamines, such as ethoxylated tall fatty acid amine or ethoxylated stearyl monoamine; ethoxylated alkyl diamines such as ethoxylated tall fatty acid propylene diamine; ethoxylated alkyl amides such as ethoxylated N-alkyl amide; quaternary ammonium salts such as trimethyl stearyl ammonium chloride, dimethyl dicocoammonium chloride and stearylamidopropyl-dimethyl-$\beta$-hydroxyethyl ammonium dihydrogen phosphate and compounds such as alkylimidazoline and tall fatty acid amino acetate; as examples of suitable amphoteric surface active compounds may be mentioned tall fatty acid propylene diaminopropionic acid and N-coco-$\beta$-amino butyric acid. An amphoteric emulsifying agent may, of course, be used as such because in the acidic polymer dispersion it behaves as a cationic emulsifying agent. Also mixtures of surface active compounds may be used. The emulgator system is usually employed in an amount of 0.1 to 15% by weight, and preferably in an amount of 0.2 to 4% by weight, based on the film-forming polymer. In the case of a self-emulsifying polymer, however, there is no need to add an emulsifying agent.

Along with the carboxylic acid radical derived from acrylic acid and/or methacrylic acid or an oligomer thereof which must be contained in the cationic dispersion according to the invention, other acid radicals may be employed, for instance those derived from: glycolic acid, oxalic acid, mandelic acid, propanoic acid, ethoxyacetic acid, maleic acid, itaconic acid, malic acid, tatronic acid, glutaric acid, cyclobutanedicarboxylic acid, tricarballylic acid, citric acid, succinic acid and/or malonic acid. Other acid radicals such as those derived from mineral acids or from acids such as acetic acid, monochloroacetic acid and trichloroacetic acid may, if desired, additionally be present in or added to the dispersion in small amounts, provided that they do not predominantly interfere in the formation of the coating on the substrate. The acid radical may be added to or present in the polymer dispersion as salt, for instance as alkali metal salt and/or in the form of acid. Usually, the carboxylic acid radical may be added as acid and in such an amount that the pH of the dispersion has a value below about 6, and preferably between $\frac{1}{2}$ and 4. The metal surface may be contacted with the acidic aqueous dispersion of the film-forming polymer in any suitable manner, for instance by rolling, spraying, brushing, sprinkling or pouring. As a rule, the contacting will be effected by dipping.

The time the metal surface is in contact with the acidic polymer dispersion may vary between wide limits, for instance between 2 seconds and 15 minutes. Between wide limits the temperature of the polymer dispersion is of little influence on the thickness of the polymer coating. In general the temperature may be between the freezing point and the boiling point of the dispersion, for instance between 1° and 95° C., and preferably between 5° and 40° C.

The aqueous dispersion of the film-forming polymer may contain usual and suitable additives, for instance: pigments; fillers; anti-foaming agents; dispersing agents; thickeners, corrosion inhibitors; softeners, cosolvents; coalescing agents; siocatives such as metal naphthenates; and waxes. Moreover, the aqueous polymer dispersion may contain organic solvents, for instance toluene or xylene. The polymer dispersion also may contain other polymeric compounds for instance water-soluble resins or polymers, amino resins, such as urea formaldehyde resins and melamine-formaldehyde resins; phenol-formaldehyde resins, polyvinyl pyrrolidone and polyvinyl methyl ether.

After the coating has been applied to the metal surface, it is dried in the usual manner and very often it is baked, for instance at temperatures between 70° and 300° C., for 2 to 60 minutes.

EXAMPLE I

Into a reactor provided with a stirrer, a thermometer, a nitrogen inlet, a reflux condenser and a funnel were charged 700 grams of demineralized water, 6 grams of ethoxylated primary monoamine with 2 ethylene oxide groups (available under the trade name Ethomeen T 12) derived from tall fatty acid, about 1 gram of acrylic acid to neutralize the surface active compound, 3.4 grams of a 30% by weight-aqueous solution of hydrogen peroxide and 0.6 grams of a 1% by weight-aqueous solution of cupric nitrate.

Of 300 grams of a monomer mixture, which consisted of 130 grams of styrene and 155 grams of butyl acrylate and 15 grams of acrylic acid, there were first added 90 grams. Subsequently, the air present in the reactor was replaced with nitrogen and the contents of the reactor were emulsified by stirring. Next, the reaction mixture was heated to 90° C. and the remaining 210 grams of the monomer mixture were added to the reactor over a period of 2 hours, after which the temperature was maintaind at 90° C. for two hours. The resulting dispersion had a solids content of 26.7% and a pH-value of 2.6.

A steel test panel cleaned in the usual way was immersed for 1 minute in the dispersion obtained as described above. After the test panel had been rinsed in demineralized water and following baking for 20 minutes at 180° C., it was found to be covered with a properly adherent coating having a thickness of 30 μm.

EXAMPLE II

Example I was repeated, except that as cationic surface active compound N-tall fatty acid propylene diamine (available under the trade name Duomeen T) and a monomer mixture composed of 105 grams of styrene, 135 grams of butyl acrylate, 45 grams of acrylonitrile and 15 grams of acrylic acid were added. The dispersion in which an oligomer of acrylic had formed had a solids content of 28.3% and a pH-value of 2.7. On the steel test panel a properly adherent polymer coating having a thickness of 50 μm was obtained.

EXAMPLE III

Example I was repeated, except that as surface active compound 12.0 grams of a 50% by weight-solution of a quaternary dialkyl ammonium chloride in isopropanol (available under the trade name Arquad 2C-50) were used. The resulting dispersion has a solids content of 28.9% and a pH-value of 1.9. To this dispersion there was still added 6% by weight (calculated on the dispersion) of a 10% by weight aqueous solution of acrylic acid. The resulting properly adherent polymer coating on the test panel had a thickness of 20 μm.

EXAMPLE IV

The procedure used in Example I was repeated, except that use was made of monochloroacetic acid instead of acrylic acid to neutralize the surface active compound and of monomer mixture composed of 135 grams of styrene and 165 grams of butyl acrylate. The dispersion had a solids content of 28.2% and a pH-value of 4.0. To this dispersion there was still added 4% by weight (based on the dispersion) of a 10% by weight-aqueous solution of acrylic acid. The use of the dispersion thus obtained resulted in the test panel having a properly adherent polymer coating with a thickness of 30 μm. When instead of acrylic acid a polyacrylic acid having a polymerization degree of 20 was employed, the dispersion immediately destabilized and was no longer suitable to be used.

EXAMPLE V

Example IV was repeated, except that as surface active compound 3 grams of a 55% by weight-aqueous solution of N-coco-β- aminobutyric acid (available under the trade name Armeen Z) were used. The resulting dispersion had a solids content of 28.1% and a pH-value of 3.1. To this dispersion there was still added 6% by weight (based on the dispersion) of a 10% by weight aqueous solution of methacrylic acid. The use of the dispersion obtained resulted in a steel test panel having a properly adherent coating with a thickness of 15 μm.

EXAMPLE VI

Into a reactor, provided with a stirrer, a reflux condenser and a funnel there were charged 10 grams of polyurethane resin of the formula

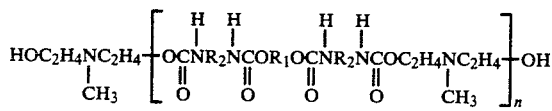

where $R_1$ represents the group formed by abstaction of the terminal hydroxyl groups from a hydroxypolyester with an $M_n=750$ and composed of 1,6-hexane diol and adipic acid, $R_2$ represents a 2,4-toluylene group and a 2,6-toluylene group in a ratio of 80:20, and where n is a number between about 10 and about 20.

The polyurethane resin was dissolved in 50 milliliters of tetrahydrofuran and subsequently neutralized with acrylic acid. Next, the resin solution was slowly dispersed in 90 grams of demineralized water under reflux followed by distilling off the tetrahydrofuran. The resulting dispersion had a solids content of 10%. To this dispersion was still added 2% by weight (based on the dispersion) of a 10% by weight-aqueous solution of acrylic acid. Applied to a steel test panel pre-treated with a zinc phosphate, the dispersion thus obtained resulted in a properly adherent polymer coating having a thickness of 10 μm.

Although the invention is described in detail for the purpose of illustration, it is to be understood that such detail is solely for that purpose and that variations can be made therein by those skilled in the art without departing from the spirit and scope of the invention except as it may be limited by the claims.

We claim:

1. In an autodeposition process of applying a coating of film-forming material to an acid-etchable metal, the metal surface being contacted with an aqueous dispersion of the film-forming material, which contains a metal-etching acid, followed by drying the coating, the improvement which comprises cationically dispersing the film-forming material in a cationic dispersion which contains the carboxylic acid radical derived from acrylic acid, methacrylic acid or an oligomer thereof and a cationic surfactant in an amount of at least 0.1% by weight.

2. The process of claim 1 wherein the metal substrate is steel.

3. The process of claim 1 wherein the cationic dispersion contains a cationic or amphoteric surface active compound.

4. The process of claim 3 wherein the cationic dispersion contains 0.1–15% by weight of surface active compound, based on the film-forming polymer.

5. The process of claim 1 wherein the pH of the cationic dispersion has a value below about 6.

6. An autodeposition process for coating an acid-etchable metal with a polymer which comprises covering the metal with a cationic dispersion of a polymer in water containing a metal-etching acid and a carboxylic acid radical derived from acrylic acid, methacrylic acid or an oligomer thereof.

* * * * *